H. E. WARREN.
SELF STARTING SYNCHRONOUS MOTOR.
APPLICATION FILED DEC. 26, 1916.

1,283,432.

Patented Oct. 29, 1918.

Inventor
Henry E. Warren
by Jas. H. Churchill
Atty.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SELF-STARTING SYNCHRONOUS MOTOR.

1,283,432.   Specification of Letters Patent.   Patented Oct. 29, 1918.

Application filed December 26, 1916. Serial No. 138,763.

*To all whom it may concern:*

Be it known that I, HENRY E. WARREN, a citizen of the United States, residing in Ashland, in the county of Middlesex and State of Massachusetts, have invented an Improvement in Self-Starting Synchronous Motors, of which the following description, in connection with the accompanying drawings, is a specification, like characters on the drawings representing like parts.

This invention relates to self-starting synchronous motors of the type shown and described in another application Se. No. 134260 filed by me December 1, 1916.

Synchronous motors of the type referred to have strong starting and moderate synchronizing characteristics, and therefore are of limited power. The present invention has for its object to increase the power and usefulness of motors of the type referred to without interfering with or diminishing their strong starting characteristics.

To this end, I have provided the rotor of motors of the type referred to, which comprises a member having strong starting and weak synchronizing characteristics, with an element or member which has zero or weak starting characteristics but strong synchronizing characteristics, whereby the rotor can start from rest with a strong torque, and when brought to complete synchronism has its power increased so that the rotor can be driven against a much heavier resistance.

In the present instance I have illustrated one construction or form of synchronizing element, which I may prefer, and which consists of one or more pairs of pins of magnetic material, preferably of hardened steel, and which for the best results are located substantially diametrically opposite and extend axially of the rotor.

Figure 1:
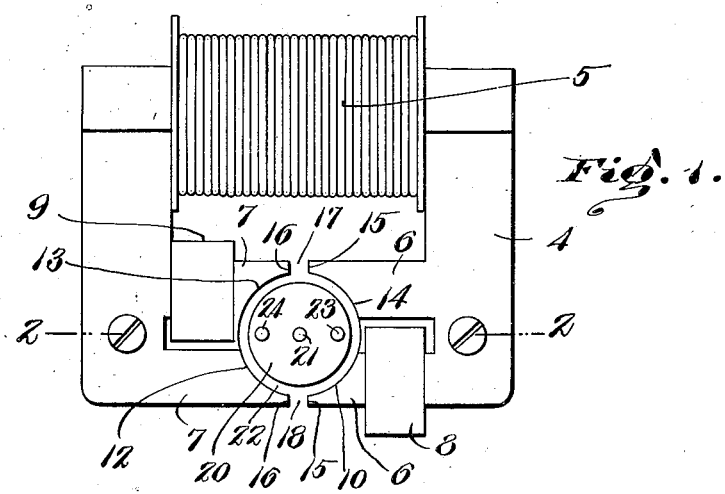

Figure 1 is a plan view of a self-starting synchronous motor embodying this invention.

Figure 2:
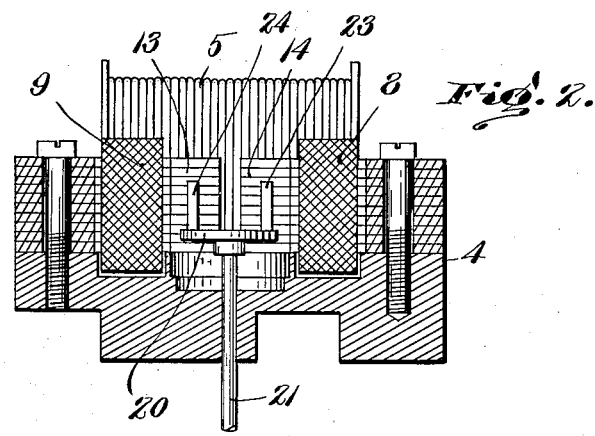

Fig. 2 a vertical section on the line 2—2, Fig. 1, and

Figure 3:
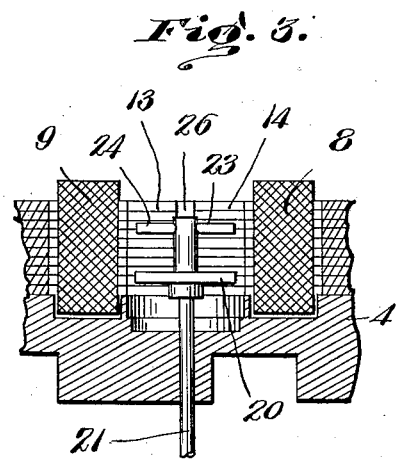

Fig. 3, a like section of a modification to be referred to.

The general construction of the motor is substantially the same as that shown and described in the application referred to and consists of a field magnet 4 provided with the coil 5, and having its pole pieces 6, 7 provided with shading coils 8, 9, and with circular polar faces 10, 12, 13, 14, and with straight faces 15, 16, which oppose each other and are separated by substantially small or narrow air gaps 17, 18. Within the rotary magnetic field formed by the pole pieces 6, 7, and shading coils 8, 9, is an unwound rotor, which is substantially non-polar geometrically and magnetically polar, and preferably is made as a circular disk 20 of hardened steel, fast on a shaft 21, which is operatively connected with the part or device to be driven. The disk 20 is made of smaller diameter than the circular pole faces so as to be separated therefrom by a substantially large or wide air gap 22.

The rotor of the motor as thus far described comprises a member having strong starting characteristics, and is able to start from rest with a strong torque, but when synchronism is reached, its power to overcome resistance to turning the shaft 21 is limited.

In accordance with the present invention I have provided the rotor 20 with an element or member with which the power of the motor may be materially increased without interfering with or diminishing the starting torque of the rotor.

This element or member is shown in the present instance, as two pins or bars 23, 24 of magnetizable material, preferably of hardened steel, which as shown in Figs. 1 and 2 are located substantially diametrically opposite on the disk 20 and are extended in a direction substantially parallel with the axis of the rotor, and project into a portion of the magnetic field which is outside of that zone in which the disk 20 rotates, but which may project at an angle to the axis, and in Fig. 3, they are shown as projecting radially from an extension 26 of the axis 21.

The length and diameter of the pins 23, 24, are such as not to prevent the rotating disk 20 from starting from rest, and with the arrangement shown in Fig. 1, I find that the distribution of the magnetic flux in the rotating field which involves both the rotor disk and the pins, is such that the pins have only a very slight or a negligible retarding influence when the rotor is at rest in any position, and consequently the disk 20 which has very strong self-starting characteristics is able to start with a strong torque. As soon, however, as the rotor 20 reaches complete synchronism, the distribution of the magnetic flux within it becomes fixed in such a manner that the projecting pins 23, 24, become strongly polarized and are able to drive the rotor against a much heavier resistance than the disk alone, as in my application above referred to. In both of the constructions shown in Figs. 2 and 3, the pole pieces 6, 7, are made of a depth sufficient to insure a magnetic field in which the rotor and pins are located, and in the construction shown in Fig. 3, wherein the pins are parallel with the disk, the pins are separated a sufficient space to prevent the pins affecting the starting torque of the disk.

In Fig. 3, the rotor is shown as composed of a single disk and one pair of pins, but it is obvious that there may be a plurality of disks like 20 spaced apart and each having a set of radial pins 23, 24 coöperating with it, with a corresponding increase in the strength of the rotor.

Claims.

1. A self-starting synchronous motor provided with means for producing a rotating magnetic field, and having a rotor consisting of one or more hardened steel substantially non-polar disks with a plurality of pins of magnetic material projecting into a portion of said field outside of the zone in which the disk rotates.

2. A self-starting synchronous motor having a rotor consisting of one or more hardened steel substantially non-polar disks with one or more pins projecting in a direction parallel to the axis of the rotor.

3. A self-starting synchronous motor provided with means for producing a rotating magnetic field, and having a rotor comprising a member having inherent strong starting and moderate synchronizing characteristics and a member having inherent zero or weak starting characteristics and strong synchronizing characteristics projecting into a portion of the said field outside the zone in which the first-mentioned member rotates, said members being located in said rotating magnetic field when the rotor is at rest and coöperating with each other to start the rotor with a strong torque and to increase the power of the rotor when the latter has been brought to complete synchronism.

4. A self-starting synchronous motor provided with means for producing a rotating magnetic field, and having a rotor comprising a member of magnetizable material and substantially non-polar geometrically which is located in said field when the rotor is at rest, and a member inherently capable of becoming strongly polarized by said rotating magnetic field and also located in said field when the rotor is at rest and projecting into a portion of the field outside the zone in which the first-mentioned member rotates and coöperating with the first-mentioned member to establish substantially fixed poles therein when the rotor reaches complete synchronism.

5. A self-starting synchronous motor provided with means for producing a rotating magnetic field, and having a rotor composed of a member of magnetizable material which has inherent strong starting characteristics, and a member of magnetizable material which has inherent zero or negative starting characteristics and strong synchronizing characteristics under the influence of said magnetic field, said members being located in said field when the rotor is at rest to be simultaneously acted upon by said field, and said second member projecting into a portion of the field outside the zone in which the first-mentioned member rotates.

6. A self-starting synchronous motor provided with means for producing a rotating magnetic field, and having a rotor comprising members rotatable simultaneously in said magnetic field when the rotor is at rest and when it reaches complete synchronism and one of which has inherent strong starting and moderate synchronizing characteristics and the other of which has inherent weak starting and strong synchronizing characteristics which projects into a portion of the field outside the zone in which the first-mentioned member rotates and which coöperates with the first-mentioned member to increase the power of the rotor when the latter reaches complete synchronism.

In testimony whereof, I have signed my name to this specification.

HENRY E. WARREN.